United States Patent
Frierson, II

(10) Patent No.: US 9,629,356 B1
(45) Date of Patent: Apr. 25, 2017

(54) DECOY PULL LINE ACTUATING APPARATUS

(71) Applicant: Christian B. Frierson, II, Shreveport, LA (US)

(72) Inventor: Christian B. Frierson, II, Shreveport, LA (US)

(*) Notice: Subject to any disclaimer, the term of this patent is extended or adjusted under 35 U.S.C. 154(b) by 169 days.

(21) Appl. No.: 14/626,393

(22) Filed: Feb. 19, 2015

(51) Int. Cl.
| *A01M 31/06* | (2006.01) |
| *A01K 91/06* | (2006.01) |
| *A01M 31/00* | (2006.01) |
| *F16H 21/18* | (2006.01) |

(52) U.S. Cl.
CPC ........... *A01M 31/06* (2013.01); *A01K 91/065* (2013.01); *A01M 31/00* (2013.01); *F16H 21/18* (2013.01)

(58) Field of Classification Search
CPC .............................. A01M 31/06; A01K 91/065
USPC .................................................. 43/3, 2, 19.2
See application file for complete search history.

(56) References Cited

U.S. PATENT DOCUMENTS

| | | | | |
|---|---|---|---|---|
| 2,517,962 A * | 8/1950 | Bastie | A01K 85/16 | 43/42.12 |
| 2,692,451 A * | 10/1954 | Deuster | A01K 85/16 | 43/3 |
| 2,707,843 A * | 5/1955 | Howe | A01K 91/065 | 43/26.1 |
| 2,783,574 A * | 3/1957 | Bayes | A01K 97/125 | 43/16 |
| 2,795,072 A * | 6/1957 | Porter | A01K 97/11 | 43/16 |
| 3,031,790 A * | 5/1962 | Duryea | A01K 91/065 | 43/19.2 |
| 3,168,789 A * | 2/1965 | Gednalske | A01K 97/01 | 43/19.2 |
| 3,422,561 A * | 1/1969 | McLean | A01K 97/10 | 43/19.2 |
| 3,550,302 A * | 12/1970 | Creviston | A01K 91/065 | 43/19.2 |
| 3,568,352 A * | 3/1971 | Hill | A01K 91/065 | 43/19.2 |
| 3,691,668 A * | 9/1972 | Strebig | A01K 91/065 | 43/19.2 |
| 3,839,810 A * | 10/1974 | Lagasse | A01K 91/065 | 43/19.2 |
| 4,232,469 A * | 11/1980 | Shiverdecker | A01K 85/16 | 43/42.27 |
| 4,310,983 A * | 1/1982 | Irvin | A01K 97/01 | 43/19.2 |

(Continued)

FOREIGN PATENT DOCUMENTS

| | | | | |
|---|---|---|---|---|
| CA | 1136855 A | * | 12/1982 | ........... A01K 91/065 |
| CA | 2424218 C | * | 5/2006 | ............. A01K 97/01 |

(Continued)

*Primary Examiner* — Darren W Ark
(74) *Attorney, Agent, or Firm* — R. Keith Harrison

(57) ABSTRACT

A decoy pull line actuating apparatus includes an apparatus base, an apparatus frame carried by the apparatus base and an arm actuating motor carried by the apparatus frame. A pull arm assembly includes an arm linkage drivingly engaged for rotation by the arm actuating motor, an actuating arm drivingly engaged for reciprocation by the arm linkage and a pull arm pivotally carried by the apparatus frame and drivingly engaged for reciprocation by the actuating arm.

10 Claims, 4 Drawing Sheets

(56) References Cited

U.S. PATENT DOCUMENTS

| | | | | |
|---|---|---|---|---|
| 4,535,560 A | * | 8/1985 | O'Neil | A01M 31/06 43/3 |
| 4,680,885 A | * | 7/1987 | Lindell | A01K 91/065 43/19.2 |
| 4,779,371 A | * | 10/1988 | Braud | A01K 97/01 43/19.2 |
| 4,910,905 A | * | 3/1990 | Girdley | A01M 31/06 43/3 |
| 4,916,847 A | * | 4/1990 | Rusgo | A01K 91/065 43/19.2 |
| 4,932,151 A | * | 6/1990 | Cicha | A01K 91/065 43/19.2 |
| 5,036,614 A | * | 8/1991 | Jackson | A01M 31/06 43/3 |
| 5,119,580 A | * | 6/1992 | Schulte | A01K 91/065 43/19.2 |
| 5,437,121 A | * | 8/1995 | Chacon, Jr. | A01K 91/065 43/19.2 |
| 5,473,835 A | * | 12/1995 | Emett | A01K 91/065 43/19.2 |
| 5,540,010 A | * | 7/1996 | Aragona | A01K 91/065 43/19.2 |
| 5,570,534 A | * | 11/1996 | Ford | A01K 91/065 43/19.2 |
| 5,974,720 A | * | 11/1999 | Bowling | A01M 31/06 43/2 |
| 6,088,945 A | * | 7/2000 | Sanderfoot | A01K 97/01 43/19.2 |
| 6,138,396 A | * | 10/2000 | Capps | A01M 31/06 43/3 |
| 6,374,529 B1 | * | 4/2002 | Petroski | A01M 31/06 43/3 |
| 6,430,863 B1 | * | 8/2002 | Krag | A01M 31/06 43/3 |
| 6,442,885 B1 | * | 9/2002 | Payne | A01M 31/06 43/3 |
| 6,574,902 B1 | * | 6/2003 | Conger | A01M 31/06 43/2 |
| 6,651,373 B2 | * | 11/2003 | Harris | A01K 97/01 43/19.2 |
| 6,834,458 B1 | * | 12/2004 | Hand, III | A01M 31/06 43/3 |
| 6,845,586 B1 | * | 1/2005 | Brock, IV | A01M 31/06 43/2 |
| 7,043,865 B1 | * | 5/2006 | Crowe | A01M 31/06 43/3 |
| 7,322,144 B2 | * | 1/2008 | Brewer | A01M 31/06 43/3 |
| 7,963,064 B2 | * | 6/2011 | Smith | A01M 31/06 43/2 |
| 8,453,371 B1 | * | 6/2013 | Sullivan | A01K 91/065 43/19.2 |
| 8,484,883 B2 | * | 7/2013 | Rogers | A01M 31/06 43/2 |
| 8,950,103 B2 | * | 2/2015 | Bullerdick | A01M 31/06 43/2 |
| 2003/0041500 A1 | * | 3/2003 | Thomas | A01M 31/06 43/2 |
| 2012/0079754 A1 | * | 4/2012 | Walko | A01K 91/065 43/26.1 |
| 2013/0185986 A1 | * | 7/2013 | Stiffler | A01M 31/06 43/3 |
| 2014/0338248 A1 | * | 11/2014 | Leventini | A01M 31/06 43/2 |

FOREIGN PATENT DOCUMENTS

| | | | | |
|---|---|---|---|---|
| ES | WO 2004016084 A1 | * | 2/2004 | A01K 91/065 |
| IT | WO 9955149 A1 | * | 11/1999 | A01K 91/065 |
| KR | 101196516 B1 | * | 11/2012 | |
| KR | 20120133726 A | * | 12/2012 | |

* cited by examiner

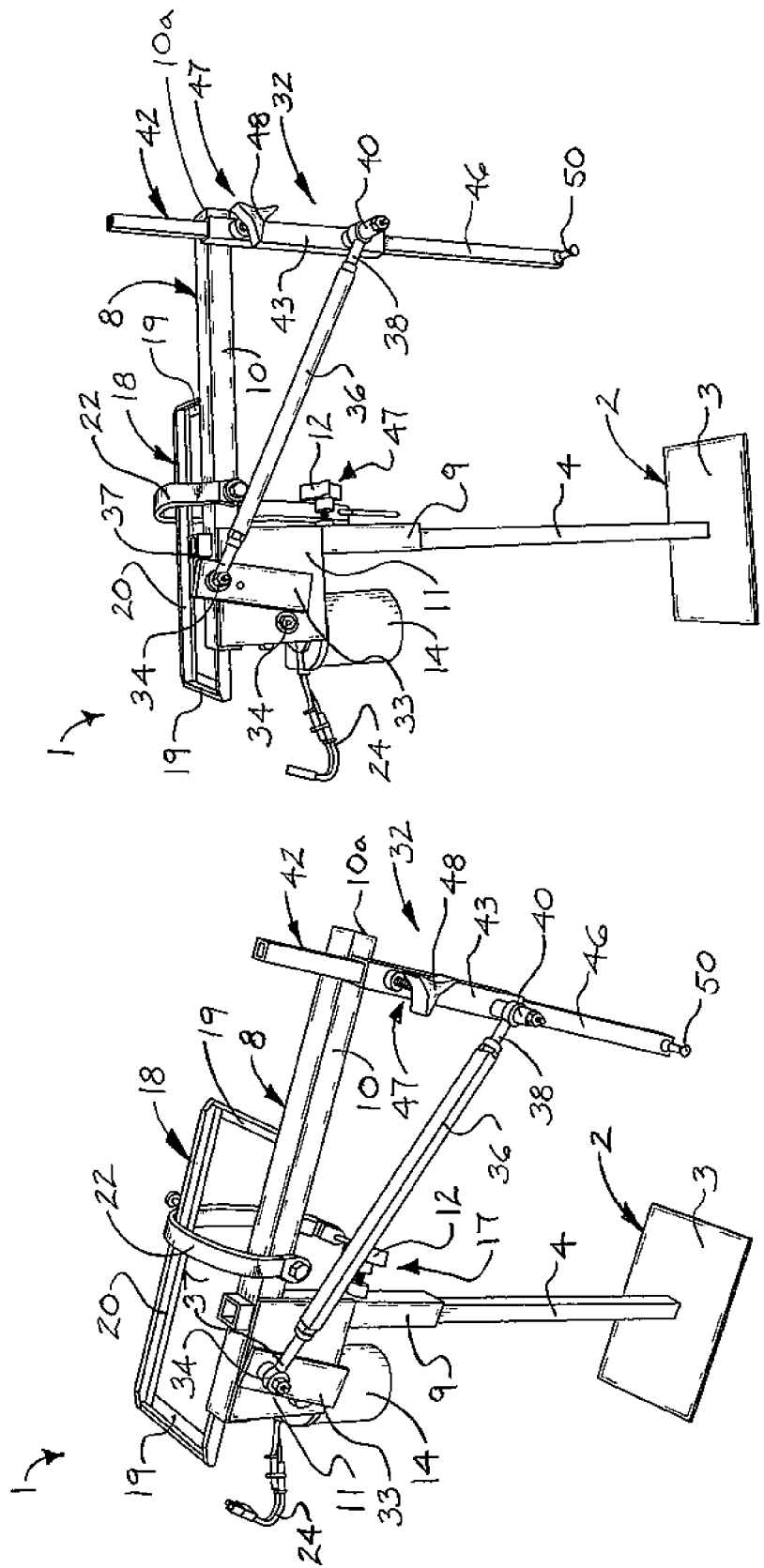

DECOY PULL LINE ACTUATING APPARATUS

FIELD

Illustrative embodiments of the disclosure generally relate to water fowl decoys for attracting waterfowl. More particularly, illustrative embodiments of the disclosure relate to a decoy pull line actuating apparatus which repeatedly pulls and releases a decoy pull line to which one or more waterfowl decoys are attached as the decoys float on a body of water to impart lifelike motion to the decoys.

SUMMARY

Illustrative embodiments of the disclosure are generally directed to a decoy pull line actuating apparatus which repeatedly pulls and releases a decoy pull line to which one or more waterfowl decoys are attached as the decoys float on a body of water to impart life-like motion to the decoys. An illustrative embodiment of the decoy pull line actuating apparatus includes an apparatus base, an apparatus frame carried by the apparatus base and an arm actuating motor carried by the apparatus frame. A pull arm assembly includes an arm linkage drivingly engaged for rotation by the arm actuating motor, an actuating arm drivingly engaged for reciprocation by the arm linkage and a pull arm pivotally carried by the apparatus frame and drivingly engaged for reciprocation by the actuating arm.

BRIEF DESCRIPTION OF THE DRAWINGS

Illustrative embodiments of the disclosure will now be described, by way of example, with reference to the accompanying drawings, wherein:

FIG. 1 is a right side front perspective view of an illustrative embodiment of the decoy pull line actuating apparatus;

FIG. 2 is a right side perspective view of the illustrative decoy pull line actuating apparatus;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 4:
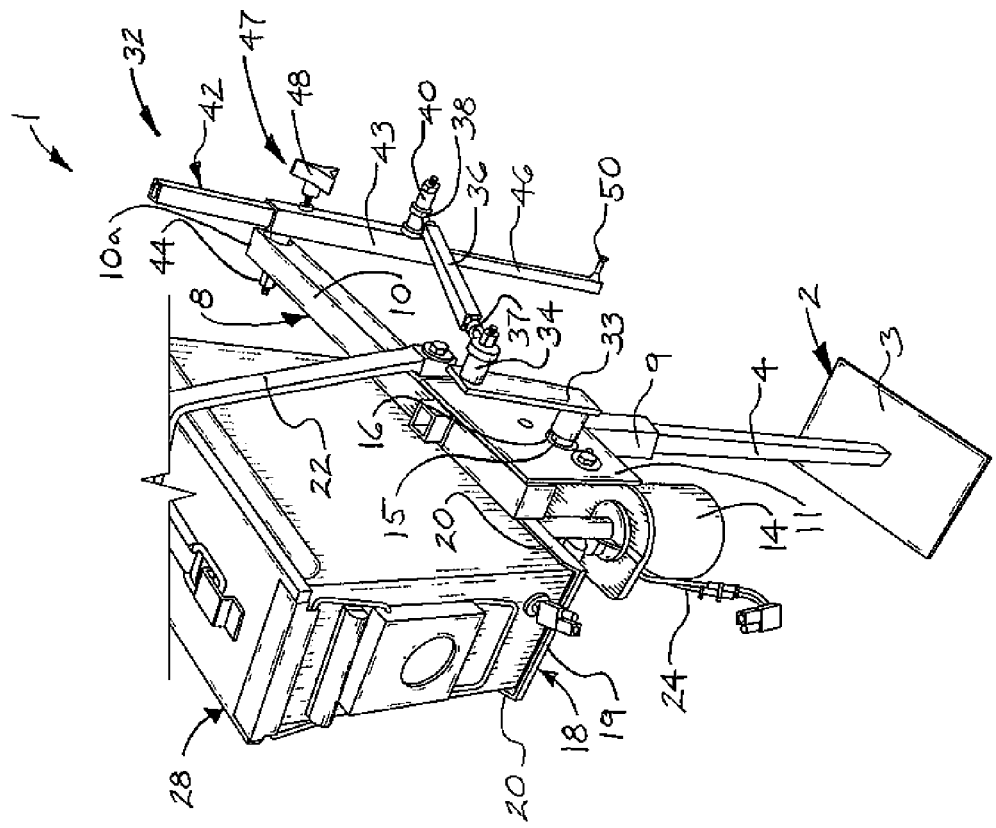
FIG. 4 is a rear perspective view, partially in section, of the illustrative decoy pull line actuating apparatus with a battery housing which contains a battery (not illustrated) provided on the apparatus.

Referring initially to FIGS. 1-5 of the drawings, an illustrative embodiment of the decoy pull line actuating apparatus is generally illustrated by reference numeral 1. The decoy pull line actuating apparatus 1 may include an apparatus base 2. The apparatus base 2 may include a base plate 3 and a frame support member 4 which extends upwardly from the base plate 3. In application of the decoy pull line actuating apparatus 1, which will be hereinafter described, the base plate 3 may support the decoy pull line actuating apparatus 1 on land 64 (FIG. 6) adjacent to a water body 62 or on the bottom of the water body 62. Alternatively, the base plate 3 may be omitted and the frame support member 4 may be inserted in the ground on the land 64 (FIG. 6) adjacent to the water body 62 or in the bottom of the water body 62. An apparatus frame 8 is provided on the apparatus base 2. In some embodiments, the apparatus frame 8 may be height-adjustable on the apparatus base 2. Accordingly, the apparatus frame 8 may include a base receptacle 9 which telescopically receives the upper end of the frame support member 4 of the apparatus base 2. A generally elongated frame arm 10 may extend from the base receptacle 9. The frame arm 10 may be disposed in generally perpendicular relationship to the base receptacle 9. A frame plate 11 may be provided at the junction, intersection or connecting point between the base receptacle 9 and the frame arm 10. The frame plate 11 may be welded, bolted and/or otherwise attached to the base receptacle 9 and the frame arm 10 according to the knowledge of those skilled in the art. As illustrated in FIG. 4, a drive shaft opening 16 may extend through the frame plate 11 for purposes which will be hereinafter described.

Figure 5:
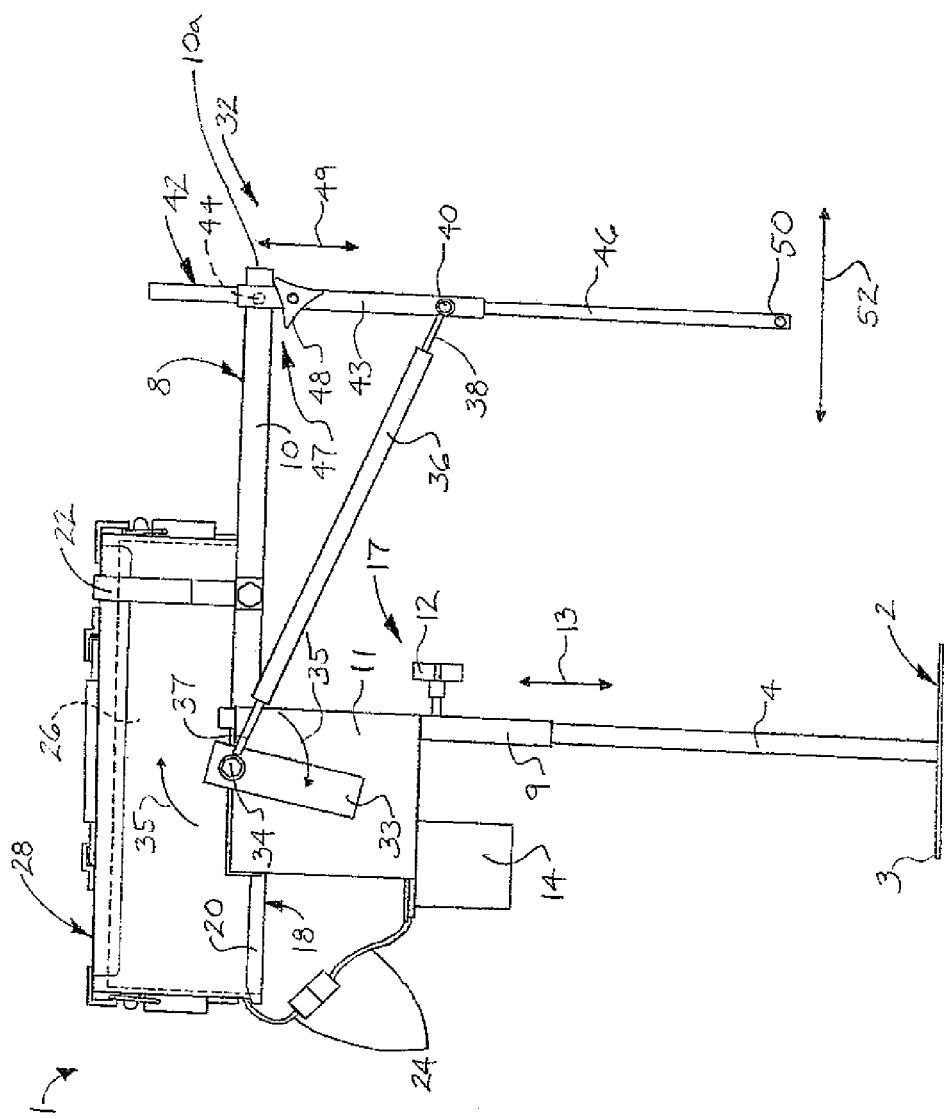
FIG. 5 is a right side view of the illustrative decoy pull line actuating apparatus, more particularly illustrating reciprocation of a pull arm to which a decoy pull line (not illustrated) is connected to pull and release one or more waterfowl decoys attached to the decoy pull line in typical application of the apparatus.

A frame height adjusting mechanism 17 may facilitate adjustment in securing of the apparatus frame 8 at a selected height on the apparatus base 2, as indicated by the frame height adjustment arrow 13 in FIG. 5, for purposes which will be hereinafter described. The frame height adjusting mechanism 17 may include any type of height adjusting mechanism which is suitable for the purpose. In some embodiments, the frame height adjusting mechanism 17 may include a frame height adjusting knob 12 which threadably engages a knob opening (not illustrated) in the base receptacle 9 to selectively engage or disengage the frame support member 4 of the apparatus base 2. In other embodiments, the frame height adjusting mechanism 17 may include a frame height adjusting pin (not illustrated) which is inserted through registering pin openings (not illustrated) in the base receptacle 9 and the frame support member 4, respectively.

An arm actuating motor 14 may be supported by the apparatus frame 8. In some embodiments, the arm actuating motor 14 may be attached to the frame plate 11 of the apparatus frame 8 via welding, brackets, mechanical fasteners (not illustrated) and/or other suitable attachment technique known by those skilled in the art. As illustrated in FIG. 4, an arm linkage drive shaft 15 may be drivingly engaged by the arm actuating motor 14. The arm linkage drive shaft 15 may extend through the drive shaft opening 16 in the frame plate 11. In some embodiments, the arm actuating motor 14 may be electric. Accordingly, as illustrated in FIG. 5, at least one battery 26 (illustrated in phantom) may be electrically connected to the arm actuating motor 14 typically through a battery connecting cable 24. In some embodiments, a switch (not illustrated) may be provided in the battery connecting cable 24. The battery 26 may be supported by the apparatus frame 8 according to the knowledge of those skilled in the art. In some embodiments, a battery support platform 18 may be provided on the frame arm 10 of the apparatus frame 8. As particularly illustrated in FIG. 3, the battery support platform 18 may include a pair of generally elongated, parallel, spaced-apart longitudinal platform members 20, one of which may be welded, fastened and/or otherwise secured to the frame arm 10 of the apparatus frame 8. A pair of parallel, spaced-apart transverse platform members 19 may extend between the longitudinal platform members 20. A battery housing 28 (FIGS. 4 and 5) may be supported by the battery support platform 18. As illustrated in FIG. 5, the battery 26 may be contained inside the battery housing 28. A battery strap 22 may be attached to the frame arm 10 of the apparatus frame 8 and may be extended over the battery housing 28 and secured using a buckle or other strap fastening device (not illustrated) to mount and secure the battery housing 28 on the battery support platform 18.

A pull arm assembly 32 is supported by the apparatus frame 8 and drivingly engaged for reciprocation by the arm actuating motor 14. As illustrated in FIGS. 1-4, the pull arm assembly 32 may include a generally elongated arm linkage 33, one end of which is drivingly engaged for rotation by the arm linkage drive shaft 15 (FIG. 4) of the arm actuating motor 14 through the drive shaft opening 16 in the frame plate 11. Accordingly, the arm actuating motor 14 rotates the arm linkage 33, as indicated by the arm linkage rotation arrows 35 in FIG. 5, through the arm linkage drive shaft 15.

Figure 3:
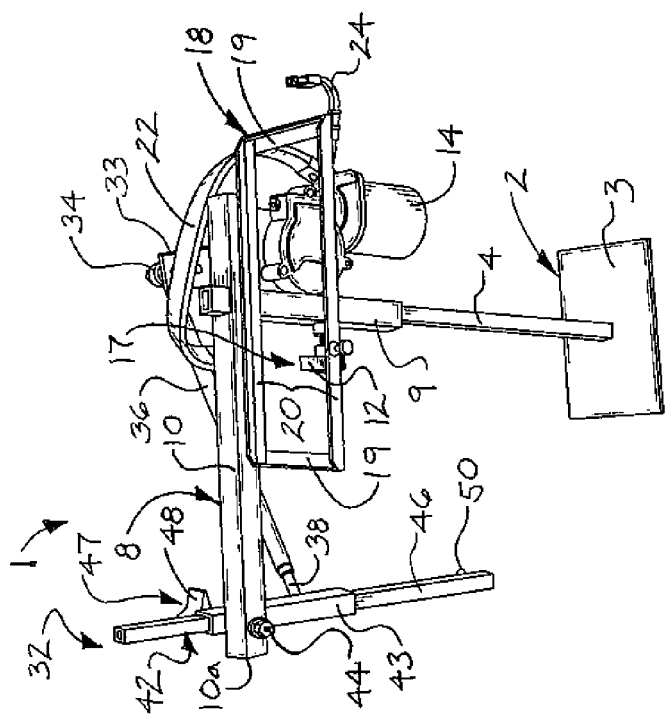
FIG. 3 is a left side perspective view of the illustrative decoy pull line actuating apparatus.

The pull arm assembly 32 further includes a pull arm 42 which is drivingly engaged for reciprocation by the rotating arm linkage 33. The pull arm 42 may include a pull arm shaft receptacle 43 which is pivotally attached to the frame arm 10 of the apparatus frame 8 at a pull arm pivot 44 (FIGS. 3 and 4). In some embodiments, the pull arm shaft receptacle 43 may be pivotally attached to the frame arm 10 generally at or adjacent to a distal arm end 10a of the frame arm 10. An elongated pull arm shaft 46 may be telescopically slidable within the pull arm shaft receptacle 43.

An actuating arm 36 may be drivingly engaged for reciprocation by the rotating arm linkage 33. The actuating arm 36 may drivingly engage the pull arm 42 for reciprocation of the pull arm 42 on the frame arm 10 of the apparatus frame 8. The actuating arm 36 may include a linkage attachment end 37 which is rotationally attached to the arm linkage 33 at an arm linkage pivot 34. A pull arm attachment end 38 of the actuating arm 36 may be pivotally attached to the pull arm shaft receptacle 43 at a receptacle pivot 40. Accordingly, upon operation of the arm actuating motor 14, the actuating arm 36 transmits and translates the rotating motion of the arm linkage 33 to a reciprocating linear motion of the pull arm 42, as indicated by the arm reciprocating arrow 52 in FIG. 5. A pull line attachment bolt 50 may be provided on the pull arm shaft 46 typically at or adjacent to the lower end thereof for purposes which will be hereinafter described.

A pull arm height adjusting mechanism 47 may facilitate adjustment in the length of the pull arm 42 and securing of the pull line attachment bolt 50 at a selected height, as indicated by the pull arm height adjustment arrow 49 in FIG. 5, for purposes which will be hereinafter described. The pull arm height adjusting mechanism 47 may include any type of height adjusting mechanism which is suitable for the purpose. In some embodiments, the pull arm height adjusting mechanism 47 may include a shaft height adjusting knob 48 which threadably engages a knob opening (not illustrated) in the pull arm shaft receptacle 43 to selectively engage or disengage the pull arm shaft 46 of the pull arm 42. In other embodiments, the pull arm height adjusting mechanism 47 may include a pull arm height adjusting pin (not illustrated) which is inserted through registering pin openings (not illustrated) in the pull arm shaft receptacle 43 and the pull arm shaft 46, respectively.

Figure 6:
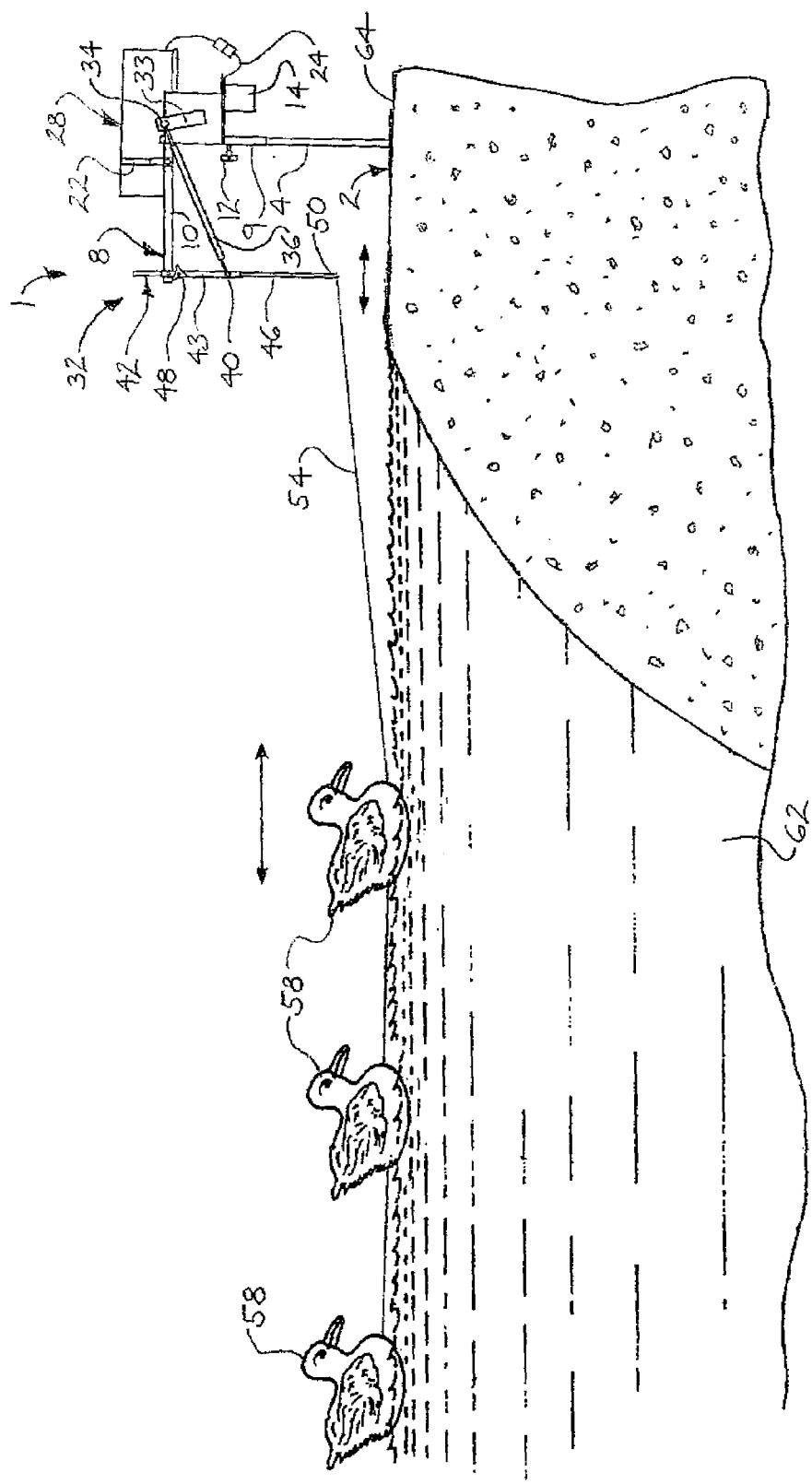
FIG. 6 is a side view of the illustrative decoy pull line actuating apparatus with a decoy pull line attached to the pull arm of the apparatus and multiple waterfowl decoys attached to the decoy pull line and floating on the surface of a water body, and further illustrating reciprocation of the pull arm to repeatedly pull and release the decoy pull line and impart a lifelike swimming motion to the decoys in typical application of the apparatus.

Referring next to FIG. 6 of the drawings, in typical application, the decoy pull line actuating apparatus 1 is deployed on land 64 adjacent to a water body 62. In some applications, the decoy pull line actuating apparatus 1 may be placed behind or within vegetation for concealment purposes. In some applications, the decoy line actuating apparatus 1 may be deployed in the water body 62 with the apparatus base 2 resting on or inserted in the bottom of the water body 62. The height of the apparatus frame 8 may be selectively adjusted, as deemed necessary, by manipulation of the frame height adjusting mechanism 17 (FIG. 5). The height of the pull line attachment bolt 50 may be selectively adjusted, as deemed necessary, by manipulation of the pull arm height adjusting mechanism 47.

A decoy pull line 54 is tied or otherwise attached to the pull line attachment bolt 50 (FIG. 5) on the pull arm shaft 46 of the pull arm 42. At least one water fowl decoy 58 is attached to the decoy pull line 54. In some applications, multiple water fowl decoys 58 may be attached to the decoy pull line 54, as illustrated. The water fowl decoys 58 may have a conventional design and may be tied or otherwise attached to the decoy pull line 54 according to the knowledge of those skilled in the art. The water fowl decoys 58 are placed for flotation on the water body 62. The arm actuating motor 14 of the decoy pull line actuating apparatus 1 may be operated typically by connecting the battery connecting cable 24 or by actuating of a switch (not illustrated) to establish flow of electrical current from the battery 26 (FIG. 5) to the arm actuating motor 14. The arm actuating motor 14 rotates the arm linkage 33, which reciprocates the pull arm 42 of the pull arm assembly 32 through the actuating arm 36. Thus, the pull line attachment bolt 50 on the pull arm shaft 46 of the pull arm 42 reciprocates in a back-and-forth motion as indicated by the arm reciprocating arrow 52 in FIG. 5. The reciprocating pull arm 52 repeatedly pulls and releases the decoy pull line 54, which actuates the water fowl decoys 58 in a forward-and-backward, lifelike swimming motion on the surface of the water body 62. This motion of the decoys 58 attracts flying or swimming waterfowl to the area in which the decoys 58 are deployed for hunting and/or observation purposes. Operation of the arm actuating motor 14 may be terminated as desired typically by disconnecting the battery connecting cable 24 or by manipulation of the switch (not illustrated).

It will be appreciated by those skilled in the art that the decoy pull line actuating apparatus 1 facilitates repeated actuation of a decoy pull line 54 to which one or more waterfowl decoys 58 are attached to impart a lifelike swimming motion to the waterfowl decoys 58. Thus, a hunter or wildlife observer need not manually actuate the decoy pull line 54 for the purpose, and the hands of the hunter or wildlife observer remain free for operation of firearms, cameras or other equipment. The decoy pull line actuating apparatus 1 can be fabricated of conventional materials which are readily available using conventional casting, molding, machining and other fabrication techniques known by those skilled in the art. For example and without limitation, the frame support member 4 of the apparatus base 2 and the base receptacle 9 and frame arm 10 of the apparatus frame 8, as well as the pull arm shaft receptacle 43 and pull arm shaft 46 of the pull arm 42, may be fabricated of steel or aluminum square tubing. The remaining components of the decoy pull line actuating apparatus 1 may be fabricated of steel, aluminum, composite and/or other materials which are commercially available.

It will be further appreciated by those skilled in the art that the height of the apparatus frame 8 can be selectively adjusted typically by actuation of the frame height adjusting mechanism 17. The height of the pull line attachment bolt 50 on the pull arm shaft 46 of the pull arm 42 can likewise be selectively adjusted by actuation of the pull arm height adjusting mechanism 47. Accordingly, the height of the decoy pull line apparatus 1 and the length of the pull arm 42 can be selected depending on such considerations as the level of the land 64 relative to the water body 62 or the level of water in the water body 62. In applications in which the decoy pull line apparatus 1 is deployed in the water body 62, the height of the decoy pull line apparatus 1 may be adjusted such that the decoy pull line 54 is at, just below or just above the level of water in the water body 62. Moreover, translation of the rotating motion of the arm linkage 33 into the linear reciprocating motion of the pull arm 42 may result in a "twitching" action of the pull arm 42 as the pull line attachment bolt 50 moves rearward and pulls the decoy pull line 54. This twitching action of the pull arm 42 may increase the lifelike quality of the swimming motion of the waterfowl decoys 58 on the water body 62.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A decoy pull line actuating apparatus, comprising:
an apparatus base;
an apparatus frame carried by the apparatus base;
an arm actuating motor carried by the apparatus frame; and
a pull arm assembly including:
an arm linkage drivingly engaged for rotation by the arm actuating motor;
an actuating arm drivingly engaged for reciprocation by the arm linkage; and
a pull arm pivotally carried by the apparatus frame and drivingly engaged for reciprocation by the actuating arm;
the actuating arm operable to repeatedly pivot the pull arm in a back-and-forth motion toward and away from the apparatus base responsive to operation of the arm actuating motor;
the apparatus base comprises a base plate and a frame support member carried by the base plate, and the apparatus frame is carried by the frame support member;
the apparatus frame comprises a base receptacle telescopically receiving the frame support member of the apparatus base and a frame arm carried by the base receptacle;
a frame plate carried by the apparatus frame, the arm actuating motor carried by the frame plate;
a battery support platform carried by the apparatus frame, the frame plate and the battery support platform on opposite sides of the apparatus frame;
a battery housing carried by the battery support platform; and
a battery contained in the battery housing and electrically connectable to the arm actuating motor.

2. The decoy pull line actuating apparatus of claim 1 wherein the apparatus frame is height-adjustable on the apparatus base.

3. The decoy pull line actuating apparatus of claim 1 wherein the pull arm of the pull arm assembly is length-adjustable.

4. The decoy pull line actuating apparatus of claim 1 further comprising a pull line attachment bolt carried by the pull arm.

5. A decoy pull line actuating apparatus, comprising:
an apparatus base;
an apparatus frame including a frame arm carried by the apparatus base;
an arm actuating motor carried by the apparatus frame; and
a pull arm assembly including:
an arm linkage drivingly engaged for rotation by the arm actuating motor;
an actuating arm drivingly engaged for reciprocation by the arm linkage; and
a pull arm having a pull arm shaft receptacle pivotally carried by the apparatus frame and drivingly engaged for reciprocation by the actuating arm and a pull arm shaft telescopically slidable within the pull arm shaft receptacle;
the actuating arm operable to repeatedly move the pull arm in a back-and-forth motion toward and away from the apparatus base responsive to operation of the arm actuating motor;
the apparatus base comprises a base plate and a frame support member carried by the base plate, and the apparatus frame is carried by the frame support member;
the apparatus frame comprises a base receptacle telescopically receiving the frame support member of the apparatus base and the frame arm carried by the base receptacle;
a frame plate carried by the apparatus frame, and wherein the arm actuating motor is carried by the frame plate;
a battery support platform carried by the apparatus frame, the frame plate and the battery support platform on opposite sides of the apparatus frame;
a battery housing carried by the battery support platform; and
a battery contained in the battery housing and electrically connectable to the arm actuating motor.

6. The decoy pull line actuating apparatus of claim 5 wherein the apparatus frame is height-adjustable on the apparatus base.

7. The decoy pull line actuating apparatus of claim 5 further comprising a pull arm height adjustment mechanism carried by the pull arm shaft receptacle and engaging the pull arm shaft.

8. The decoy pull line actuating apparatus of claim 5 further comprising a pull line attachment bolt carried by the pull arm shaft of the pull arm.

9. A decoy pull line actuating apparatus, comprising:
an apparatus base including:
    a base plate; and
    a frame support member carried by the base plate;
an apparatus frame including:
    a base receptacle telescopically receiving the frame support member of the apparatus base; and
    a frame arm carried by and perpendicular to the base receptacle;
an arm actuating motor carried by the apparatus frame; and
a pull arm assembly including:
    an arm linkage drivingly engaged for rotation by the arm actuating motor;
    an actuating arm drivingly engaged for reciprocation by the arm linkage; and
    a pull arm having a pull arm shaft receptacle pivotally carried by the frame arm of the apparatus frame and drivingly engaged for reciprocation by the actuating arm and a pull arm shaft telescopically slidable within the pull arm shaft receptacle;
the actuating arm operable to repeatedly move the pull arm in a back-and-forth motion toward and away from the apparatus base responsive to operation of the arm actuating motor;
a frame plate carried by the apparatus frame, and wherein the arm actuating motor is carried by the frame plate; and
a battery support platform carried by the frame arm of the apparatus frame, the frame plate and the battery support platform on opposite sides of the apparatus frame;
a battery housing carried by the battery support platform; and
a battery contained in the battery housing and electrically connectable to the arm actuating motor.

10. The decoy pull line actuating apparatus of claim 9 further comprising a decoy pull line attached to the pull arm shaft of the pull arm and at least one waterfowl decoy attached to the decoy pull line.

* * * * *